(12) United States Patent
Spencer et al.

(10) Patent No.: US 6,599,353 B2
(45) Date of Patent: Jul. 29, 2003

(54) SHEAR-THINNING WRITING COMPOSITIONS, WRITING INSTRUMENTS, AND METHODS

(75) Inventors: Jean L. Spencer, Boston, MA (US); Pawel Czubarow, Wellesley, MA (US)

(73) Assignee: Berol Corporation, Freeport, IL (US)

( * ) Notice: Subject to any disclaimer, the term of this patent is extended or adjusted under 35 U.S.C. 154(b) by 0 days.

(21) Appl. No.: 09/857,561

(22) PCT Filed: Apr. 20, 2001

(86) PCT No.: PCT/US01/12979

§ 371 (c)(1),
(2), (4) Date: Jun. 6, 2001

(87) PCT Pub. No.: WO01/81484

PCT Pub. Date: Nov. 1, 2001

(65) Prior Publication Data

US 2003/0041776 A1 Mar. 6, 2003

Related U.S. Application Data

(63) Continuation-in-part of application No. 09/553,119, filed on Apr. 20, 2000, now abandoned.

(51) Int. Cl.$^7$ .............................................. C09D 11/16
(52) U.S. Cl. ................... 106/31.6; 106/31.9; 106/31.7; 106/31.86; 106/31.75; 106/31.65
(58) Field of Search .............................. 106/31.6, 31.9, 106/31.7, 31.86, 31.75, 31.65

(56) References Cited

U.S. PATENT DOCUMENTS

| | | | |
|---|---|---|---|
| 2,715,388 A | 8/1955 | Cofield, Jr. et al. | 120/42.4 |
| 2,833,736 A | 5/1958 | Glaser | 260/29.6 |
| 2,852,397 A | 9/1958 | Goessling | 106/31 |
| 2,956,038 A | 10/1960 | Juelss et al. | 260/33.6 |
| 3,425,779 A | 2/1969 | Fisher et al. | 401/190 |
| 4,606,769 A | 8/1986 | Tanaka et al. | 106/30 |
| 4,652,388 A | 3/1987 | Gold | 252/62.54 |
| 4,671,691 A | 6/1987 | Case et al. | 401/142 |
| 4,687,791 A | 8/1987 | Miyajima et al. | 523/161 |
| 4,762,875 A | 8/1988 | Gold | 524/248 |
| 4,960,464 A | 10/1990 | Chen | 106/19 |
| 4,971,628 A | 11/1990 | Loftin | 106/22 |
| 5,013,361 A | 5/1991 | Case et al. | 106/22 |
| 5,039,452 A | 8/1991 | Thompson et al. | 252/518 |
| 5,048,992 A | 9/1991 | Loftin | 401/209 |
| 5,091,010 A | 2/1992 | Souma et al. | 106/403 |
| 5,213,618 A | 5/1993 | Souma et al. | 106/403 |
| 5,252,522 A | 10/1993 | Dorbath et al. | 501/19 |
| 5,364,467 A | 11/1994 | Schmid et al. | 106/404 |
| 5,445,671 A | 8/1995 | Herget et al. | 106/20 R |
| 5,474,603 A | 12/1995 | Miyashita et al. | 106/25 R |
| 5,556,527 A | 9/1996 | Igarashi et al. | 204/488 |
| 5,626,661 A | 5/1997 | Schmid et al. | 406/415 |
| 5,741,355 A | 4/1998 | Yamamoto et al. | 106/417 |
| 5,753,325 A | 5/1998 | McDaniel | 428/34.7 |
| 5,785,746 A | 7/1998 | Kito et al. | 106/31.86 |
| 5,873,934 A | 2/1999 | Kunii et al. | 106/417 |
| 5,958,123 A | 9/1999 | De La Fuente | 106/31.69 |
| 6,083,311 A | 7/2000 | Kanbayashi et al. | 106/31.65 |
| 6,099,629 A | 8/2000 | Morita et al. | 106/31.6 |
| 6,120,590 A | 9/2000 | Miyamoto et al. | 106/31.6 |
| 6,171,381 B1 | 1/2001 | Yoshimura et al. | 106/31.6 |
| 6,241,858 B1 | 6/2001 | Phillips et al. | 204/192.15 |
| 6,306,930 B1 | 10/2001 | Tsujio | 523/161 |
| 6,325,845 B1 | 12/2001 | Kurihara et al. | 106/31.68 |
| 2001/0036980 A1 | 11/2001 | Tsujio | 523/161 |

FOREIGN PATENT DOCUMENTS

| | | |
|---|---|---|
| AU | 210722 | 3/1956 |
| DE | 38 25 702 A1 | 1/1990 |
| DE | 41 41 069 A1 | 6/1993 |
| DE | 42 40 366 A1 | 6/1994 |
| EP | 0 600 205 A1 | 6/1994 |
| EP | 633 299 A | 1/1995 |
| EP | 0 686 675 B1 | 12/1995 |
| EP | 761 785 A2 | 3/1997 |
| EP | 0 787 779 A2 | 8/1997 |
| EP | 0 960 911 | 12/1999 |
| EP | 0 558 916 B1 | 4/2000 |
| EP | 1 006 162 A1 | 6/2000 |
| EP | 1 045 014 A2 | 10/2000 |
| JP | 56-120777 | 9/1981 |
| JP | 2-6566 | 1/1990 |
| JP | 03-027999 | 2/1991 |
| JP | 05-117569 | 5/1993 |

(List continued on next page.)

OTHER PUBLICATIONS

Written Opinion dated Feb. 5, 2002, for International Application No. PCT/US01/12979.

International Preliminary Examination Report dated Jul. 18, 2002, for International Application No. PCT/US01/12979.

International Search Report for PCT/US01/12979 dated Nov. 11, 2001.

Burnside et al., "Synthesis and Properties of New Poly(Dimethylsiloxane) Nanocomposites,"*Chemistry of Materials*, 7:1597–1600 (Sep., 1995).

Vaia et al., "Synthesis and Properties of Two–Dimensional Nanostructures by Direct Intercalation of Polymer Melts in Layered Silicates,"*Chemistry of Materials*, 5:1694–1696 (1993), no month available.

Vaia et al., "Interlayer Structure and Molecular Environment of Alkylammonium Layered Silicates,"*Chemistry of Materials*, 6:1017–1022 (1994), no month available.

Vaia et al., "New Polymer Electrolyte Nanocomposites: Melt Intercalation of Poly(ethylene oxide) in Mica–Type Silicates," *Advanced Materials*, 7:154–156 (1995), no month available.

Sommer et al., "Metal effect pigments" *Verfksroniek*, 71(11):25–28 (1998), no month available.

Primary Examiner—Mark L. Bell
Assistant Examiner—Veronica F. Faison
(74) *Attorney, Agent, or Firm*—Marshall, Gerstein & Borun

(57) ABSTRACT

An erasable, shear-thinning writing composition includes a shear-thinning additive and graphite particles dispersed within an aqueous solvent system.

47 Claims, No Drawings

FOREIGN PATENT DOCUMENTS

| | | |
|---|---|---|
| JP | 05-295048 | 11/1993 |
| JP | 06-299114 | 10/1994 |
| JP | 06-313142 | 11/1994 |
| JP | 07-118592 | 5/1995 |
| JP | 08-010691 | 1/1996 |
| JP | 09-188830 | 7/1997 |
| JP | 09-268270 | 10/1997 |
| JP | 10-067946 | 3/1998 |
| JP | 10-067948 | 3/1998 |
| JP | 10-158540 | 6/1998 |
| JP | 10-158541 | 6/1998 |
| JP | 10-259316 | 9/1998 |
| JP | 10-259317 | 9/1998 |
| JP | 10-279828 | 10/1998 |
| JP | 11-076868 | 3/1999 |
| JP | 11-080629 | 3/1999 |
| JP | 11-148042 | 6/1999 |
| JP | 11-360187 | 12/1999 |
| JP | 2000-002344 | 1/2000 |
| JP | 2000-002370 | 1/2000 |
| JP | 2000-071999 | 3/2000 |
| JP | 2000-072995 | 3/2000 |
| JP | 2000-103997 | 4/2000 |
| JP | 2000 119579 | 4/2000 |
| JP | 2000-119579 | 4/2000 |
| JP | 2000-282779 | 9/2000 |
| JP | 2000-345096 | 12/2000 |
| JP | 2001-026730 | 1/2001 |
| JP | 2001-72909 | 3/2001 |
| JP | 2001-72995 | 3/2001 |
| JP | 2001-080263 | 3/2001 |
| JP | 2001-081382 | 3/2001 |
| SU | 1654406 A | 6/1991 |
| WO | WO 93/12182 | 6/1993 |
| WO | WO 94/17146 | 8/1994 |
| WO | WO 95/15361 | 6/1995 |
| WO | WO 96/17025 | 6/1996 |
| WO | WO 97/35935 | 10/1997 |
| WO | WO 98/26014 | 6/1998 |
| WO | WO 98/40441 | 9/1998 |

SHEAR-THINNING WRITING COMPOSITIONS, WRITING INSTRUMENTS, AND METHODS

This is a continuation-in-part of U.S. patent application Ser. No. 09/553,119, filed Apr. 20, 2000, now abandoned the entire disclosure of which is herein incorporated by reference.

TECHNICAL FIELD

This invention relates to writing compositions, instruments, and methods and, more particularly, to erasable, shear-thinning writing compositions.

BACKGROUND OF THE INVENTION

Erasable, graphite-containing liquid writing compositions have been proposed for use in writing instruments to combine the features of pens and pencils. Writing instruments including these liquid graphite-containing compositions are similar both to pens, in that they require no sharpening, no advancing, and low application pressure, and to pencils, in that they can be used to make markings on a substrate, such as paper, which subsequently can be erased from the substrate.

SUMMARY OF THE INVENTION

According to one aspect of the invention, an erasable, shear-thinning writing composition includes a shear-thinning additive and graphite particles in a liquid.

According to another aspect of the invention, an erasable, shear-thinning writing composition includes a shear-thinning additive and graphite particles dispersed in a liquid, wherein the composition has a shear-thinning index between about 0.01 and 0.8.

In accordance with another aspect of the invention, a writing instrument includes a reservoir containing an erasable, shear-thinning writing composition comprising an aqueous solvent system, a shear-thinning additive, and graphite particles, wherein the graphite particles and the shear-thinning additive are dispersed within the aqueous solvent system. The writing instrument further includes a writing point in fluid communication with the reservoir.

In accordance with an additional aspect of the invention, a method of forming a marking includes making a marking on a substrate with an erasable, shear-thinning writing composition comprising a shear-thinning additive and graphite particles.

These and other features, aspects, and advantages of the present invention will become better understood with regard to the following description and appended claims.

DETAILED DESCRIPTION OF THE PREFERRED EMBODIMENTS

One aspect of the invention is an erasable, shear-thinning writing composition comprising a shear-thinning additive and graphite particles in a liquid.

Another aspect of the invention is an erasable, shear-thinning writing composition including a shear-thinning additive and graphite particles dispersed in a liquid wherein the erasable, shear-thinning composition has a shear-thinning index between about 0.01 and about 0.8.

Additional embodiments of these aspects may include one or more of the following features. The erasable, shear-thinning writing composition can have a shear-thinning index between about 0.01 and about 0.8. The erasable, shear-thinning composition also has a viscosity between 200 mPa·sec and 20,000 mPa·sec at a shear rate of about 1.0 sec$^{-1}$, and a viscosity between 10 mPa·sec and 1000 mPa·sec at a shear rate of about 100 sec$^{-1}$. The liquid is an aqueous solvent system. The shear-thinning additive and graphite particles are dispersed within the aqueous solvent system. The shear-thinning additive is a clay, an organoclay, a water-dispersible gum, an acrylic acid-based polymer, or a combination thereof. The clay is a hectorite clay or a bentonite clay. The water-dispersible gum is a polysaccharide, such as, for example, xanthan gum. The composition can include about 0.01 weight percent to about 10 weight percent of the shear-thinning additive, about 0.05 weight percent to about 5 weight percent of the shear-thinning additive, or about 0.1 weight percent to about 2 weight percent of the shear-thinning additive. The composition further comprises at least one water-soluble organic solvent. The composition further comprises at least one water-soluble organic solvent selected from the group consisting of glycols, polyhydric alcohols, glycol ethers, glycol ether esters, amines, amides, and alkanolamides. The water-soluble organic solvent can be a glycol, such as, for example, propylene glycol. The aqueous solvent system comprises water, propylene glycol, and glycerol. The water of the aqueous solvent system is deionized water. The mixture includes from about 0.5 part to about 25 parts water per part water-soluble organic solvent(s). The graphite particles can comprise from about 1 weight percent to about 50 weight percent of the composition, from about 3 weight percent to about 25 weight percent of the composition, or from about 5 weight percent to about 20 weight percent of the composition. The graphite particles have an average thickness of less than about 1 micron, and an average particle diameter between about 1 micron and about 25 microns, or an average thickness of less than about 0.5 micron, and an average particle diameter between about 2 microns and about 15 microns, or an average thickness of less than about 0.25 microns, and an average particle diameter between about 3 microns and about 12 microns. The graphite particles are selected from the group consisting of amorphous graphite, flake natural graphite, primary synthetic graphite, secondary synthetic graphite, and combinations thereof. The erasable, shear-thinning composition further includes one or more dispersants. The dispersant is a water-soluble polymer. The erasable, shear-thinning writing compositions can exhibit an erasability greater than about 80 percent and a line intensity greater than about 25 percent, or an erasability greater than about 95 percent and a line intensity greater than about 30 percent, or an erasability greater than 97 percent and a line intensity greater than about 40 percent. The composition further comprises pigment particles.

Another aspect according to the invention is a writing instrument comprising a reservoir containing an erasable, shear-thinning writing composition comprising an aqueous solvent system, a shear-thinning additive, and graphite particles wherein the graphite particles and the shear-thinning additive are dispersed within the aqueous solvent system. The writing instrument further contains a writing point in fluid communication with the reservoir. The writing instrument can be a pen, such as, for example, a ballpoint pen.

Yet another aspect according to the invention is a method of forming a marking comprising making a marking on a substrate with an erasable, shear-thinning writing composition. The composition comprises a shear-thinning additive and graphite particles.

Embodiments of this aspect of the invention may include one or more of the following features. The method further comprises erasing the marking from the substrate. The erasable, shear-thinning composition further comprises an aqueous solvent system. The erasable, shear-thinning composition has a shear-thinning index between about 0.01 and about 0.8. The erasable, shear-thinning writing composition has a viscosity between 200 mPa·sec and 20,000 mPa·sec at a shear rate of about 1.0 sec$^{-1}$, and a viscosity between 10 mPa·sec and 1000 mPa·sec at a shear rate of about 100 sec$^{-1}$. The substrate is paper. The marking is made with a writing instrument, such as a ballpoint pen.

In another aspect, the invention features an erasable, shear-thinning writing composition including about 30 weight percent to about 99 weight percent of an aqueous solvent system, about 0.01 weight percent to about 10 weight percent of a shear-thinning additive, and about 1 weight percent to about 50 weight percent of graphite particles dispersed within the solvent system.

In other aspects, the invention can also feature an erasable, shear-thinning writing composition including a shear-thinning additive, graphite particles, and pigment particles in a liquid. Examples of pigment particles include, but are not limited to, pearlescent pigments, such as, for example, Afflair 110, available from EM Industries, Inc., located in Hawthorne, N.Y.

Shear-thinning compositions are non-Newtonian liquids that exhibit shear-thinning flow behavior when subjected to shear. Preferred shear-thinning compositions of the invention become thin, readily flowable liquids having a viscosity of no greater than about 500 mPa·sec at shear rates greater than about 100 sec$^{-1}$. Typically, the erasable, shear-thinning composition has a viscosity between 200 mPa·sec and 20,000 mPa·sec at a shear rate of about 1.0 sec$^{-1}$, and a viscosity between 10 mPa·sec and 1000 mPa·sec at a shear rate of 100 sec$^{-1}$. The erasable, shear-thinning writing compositions of this invention generally include at least one water dispersible, shear-thinning additive dispersed in an aqueous solvent system.

In preferred implementations, the graphite particles may include amorphous graphite, flake natural graphite, primary synthetic graphite, secondary synthetic graphite, or combinations thereof. The graphite particles can be dispersed in a solvent.

When used in a writing instrument, preferred erasable, shear-thinning writing compositions exhibit even laydown. The erasable, shear-thinning compositions are erasable by common erasers, such as Pink Pearl erasers, available from Sanford Corporation, located in Bellwood, Ill., and provide good writing performance, e.g., a line intensity greater than about 25 percent, more preferably greater than about 30 percent, and most preferably greater than about 40 percent. Additionally, the graphite particles remain suspended in the composition during storage, minimizing or even eliminating the need to mix or agitate the composition prior to producing a marking of a substrate.

As used herein, the term "laydown" refers to the amount of writing fluid (e.g., shear-thinning writing composition) that is deposited on a substrate when making a marking of a particular length. Typically, the laydown for the preferred shear-thinning writing compositions according to the invention is between 0.1 mg/m and 8.0 mg/m; preferably, between 0.5 mg/m and 5.0 mg/m; and most preferably, between 1.5 mg/m and 3.5 mg/m.

As used herein, the term "even laydown" refers to the morphology of the writing fluid when applied to a substrate to create a continuous marking and is characterized by minimal skipping, i.e., few voids within the written line, and uniform thickness, i.e., the width of the written line is approximately constant along the length of the line.

As used herein, the term "line intensity" refers to the intensity of a marking made on a substrate such as, for example, paper. The intensity of a marking can be measured as the average gray value of the detected tracings (black=0; white=255). The percent intensity of the writing with an average gray value of z is then calculated as: %Intensity= (1−[z/255]) multiplied by 100. Alternatively, the intensity of a marking can be determined by calculating the difference between the recorded reflectance of the substrate without any marking ("Blank Reflectance") and the reflectance of the marking on the substrate ("Reflectance of Marking"). According to this method, the percent intensity of a marking is calculated by normalizing the calculated intensity difference to the Blank Reflectance and multiplying this value by 100. The data obtained from these two methods are comparable.

As used herein, the term "line uniformity" refers to the standard deviation of the line intensity measured along different portions of a marking made on a substrate. Line uniformity can be used as a measure of even laydown.

As used herein, the term "erasability" refers to the ability to recover the gray level reading of the blank paper by removing the written tracings with an eraser. The percent erasability can be calculated as: %Erasability=($z/z_o$) multiplied by 100 where z is the average gray value of the erased section and $z_o$ is the average gray value of the blank section of paper. Alternatively, the erasability can be determined by recording the reflectance of each erased line ("Reflectance of Erased Line") and the reflectance of the paper without any marking ("Blank Reflectance") and calculating the ratio of Reflectance of Erased Line to Blank Reflectance, i.e., $E_{tot}$= (Erased Line/Blank). According to this method, the percent erasability is calculated by multiplying $E_{tot}$ by 100. The data obtained from these two methods are comparable.

As used herein, the terms "pigment" and "pigment particles" are meant to encompass materials other than graphite and/or graphite particles.

Erasable, shear-thinning writing compositions according to the invention include a shear-thinning additive and graphite particles both dispersed in an aqueous solvent system. Typically, the composition includes from about 0.01 weight percent to about 10.0 weight percent of the shear-thinning additive, from about 1 weight percent to about 50 weight percent of graphite particles, and from about 30 weight percent to about 99 weight percent of the aqueous solvent system. Preferably, the compositions include from about 0.05 weight percent to about 5 weight percent shear-thinning additive, from about 3 weight percent to about 25 weight percent graphite particles, and from about 60 weight percent to about 96 weight percent aqueous solvent system. Most preferably, the composition includes from about 0.1 weight percent to about 2 weight percent shear-thinning additive, from about 5 weight percent to about 20 weight percent graphite particles, and from about 74 weight percent to about 94 weight percent aqueous solvent system.

Shear-thinning Additives:

Suitable shear-thinning additives are miscible or dispersible in the aqueous solvent along with the dispersed graphite particles, and provide an erasable, shear-thinning writing composition having a shear-thinning index (n) of between about 0.01 and about 0.8, preferably between about 0.05 and about 0.60, and most preferably between about 0.1 and about 0.3. The shear-thinning index (n) is determined by fitting the shear stress (τ) and shear rate (γ) values obtained from rheological measurements to the empirical power law equation: $\tau=K\gamma^n$ wherein the coefficient (K) is a constant. The exact value of K depends on the composition being tested. The shear-thinning index is also described in U.S. Pat. No. 4,671,691, the disclosure of which is incorporated herein by reference. Shear stress values are measured continuously from 0.5 sec$^{-1}$ to 1000 sec$^{-1}$ and are fit to the power law model to determine the shear-thinning index. Shear-thinning measurements can be performed on a rheometer, such as a Carri-Med Rheometer CSL$^2$-500, available from TA Instruments, located in New Castle, Del.

Suitable shear-thinning additives provide erasable, shear-thinning writing compositions which are thickened viscous liquids at rest or at low shear rates. In general, the viscosity decreases as the shear rate increases. Typically, erasable, shear-thinning writing compositions have a viscosity between 200 mPa·sec and 20,000 mPa·sec at a shear rate of about 1.0 sec$^{-1}$; preferably, the shear-thinning writing compositions have a viscosity between 2000 mPa·sec and 18,000 mPa·sec at a shear rate of about 1.0 sec$^{-1}$; and, most preferably, the shear-thinning writing compositions have a viscosity between 5000 mPa·sec and 15,000 mPa·sec at a shear rate of about 1.0 sec$^{-1}$. Typically, erasable, shear-thinning writing compositions have a viscosity between 10 mPa·sec and 1000 mPa·sec at a shear rate of 100 sec$^{-1}$; preferably, the shear-thinning writing compositions have a viscosity between 50 mPa·sec and 700 mPa·sec at a shear rate of 100 sec$^{-1}$; and, most preferably, the shear-thinning writing compositions have a viscosity between 100 mPa·sec and 500 mPa·sec at a shear rate of 100 sec$^{-1}$. As a result, the shear-thinning additives provide an erasable, shear-thinning writing composition having a shear-thinning index (n) between about 0.01 and about 0.8, a viscosity greater than 200 mPa·sec at a shear rate of about 1.0 sec$^{-1}$, and a viscosity less than about 1000 mPa·sec at shear rates above 100 sec$^{-1}$.

Suitable shear-thinning additives do not interact to any significant extent with the substrate materials, e.g., paper, on which the erasable, shear-thinning writing composition is used, in a manner that would deleteriously affect erasability. Suitable shear-thinning additives include, but are not limited to, clays, such as smectites (bentonite and hectorite), and to organoclays, typically smectites modified with long chain organic cation groups. The term "smectite" refers to a family of non-metallic clays that are primarily composed of hydrated sodium calcium aluminum silicate, including bentonite and hectorite. Common names for smectites include montmorillonite or sodium montmorillonite ("sodium bentonite" or "Wyoming bentonite") and swelling bentonite ("Western bentonite"). Bentonite is a native, colloidal, hydrated, non-metallic mineral of the dioctahedral smectite group, is primarily composed of the mineral montmorillonite, and has been processed to remove grit and non-swellable ore components. Hectorite is a native, colloidal mineral of the trioctahedral smectite group and is primarily composed of sodium magnesium lithium silicate. Typically, hectorite is processed to remove grit and impurities. Clays, such as Bentone MA, and organoclays, such as Bentone 34, are available from Rheox Inc., Hightstown, N.J.

Other suitable shear-thinning additives include water-dispersible gums or resins which can be either natural or synthetic. Natural gums include seaweed extracts, plant exudates, seed or root gums and microbiologically fermented gums. Synthetic gums, such as modified versions of cellulose or starch, include propylene glycol alginate, carboxymethyl locust bean gum and carboxymethyl guar. Many water-dispersible gums can also be described as polysaccharides, because their structure consists of repeating sugar units. Examples of water-dispersible gums include, but are not limited to, xanthan gum (Keltrol and Kelzan made by Kelco Biopolymers, San Diego, Calif.), carboxymethylcellulose (sold as a sodium salt, Blanose, by Hercules Incorporated, Wilmington, Del.), hydroxyethylecellulose (Natrosol, manufactured by Hercules; Cellosize, by Union Carbide Corporation, Danbury, Conn.), sodium alginate and other salts of alginic acid, kappa, iota and lambda carrageenan (sulfated polysaccharides extracted from red seaweed), gum arabic (mixed salts of arabic acid), gum karaya (an acetylated polysaccharide), gum tragacanth (a complex mixture of acidic polysaccharides), gum ghatti (the calcium and magnesium salt of a complex polysaccharide), guar gum (a straight chain galactomannan) and its derivatives (Jagar, manufactured by Rhodia, Inc., Cranbury, N.J.), locust bean gum (a branched galactomannan), tamarind gum, psyllium seed gum, quince seed gum, larch gum, pectin and its derivatives, dextran, hydroxypropylcellulose (Klucel, manufactured by Hercules), cellulose ethers (Methocel, manufactured by Dow Chemical Company, Midland, Mich.) and other water-soluble gums of this type.

Other suitable shear-thinning additives include high molecular weight homo- and copolymers of acrylic acid crosslinked with polyalkenyl polyether sold by B F Goodrich, Charlotte, N.C., under the tradename Carbopol, e.g., Carbopol 934, 940, and 941. Carbopol homopolymers are polymers of acrylic acid crosslinked with allyl sucrose or allylpentaerythritol, and Carbopol copolymers are polymers of acrylic acid modified by long-chain (C10–C30) alkyl acrylates and crosslinked with allylpentaerythritol. Carbopol polymers, also called Carbomers, typically have high molecular weights between about 350,000 and 5,000,000.

Graphite Particles:

Suitable graphite particles include, but are not limited to, amorphous graphite, flake natural graphite, primary synthetic graphite, and secondary synthetic graphite. Primary and secondary synthetic graphite particles are synthetically produced and purified particles, whereas amorphous and flake graphite particles are naturally occurring. Preferably, the graphite particles are flake natural graphite. Preferably, the graphite particles have an average thickness less than about 1 micron, and an average particle diameter between about 1 micron and about 25 microns; more preferably, the average thickness is less than about 0.5 micron, and the average particle diameter is between about 2 microns and about 15 microns; and most preferably, the average thickness is less than about 0.25 micron, and the average particle diameter is between about 3 microns and about 12 microns.

The dimensions of the graphite particles can also be described by an aspect ratio of the length to the width. The average length and average width can be the same or different. Typically, the average width of the graphite particles is less than the average length. An aspect ratio of the length to the width, typically, is between about 1 and about 8; preferably, between about 1 and about 3; and most preferably, between about 1 and about 2. The average dimensions of graphite particles can be ascertained by performing scanning electron microscopy (SEM). Furthermore, typically more than 90 percent of the graphite particles have a diameter between 1 micron and 20 microns; more preferably, more than 95 percent of the graphite particles are between 1 micron and 20 microns; most preferably, more than 98 percent of the graphite particles are between 1 micron and 20 microns.

In general, the largest dimension of the graphite particles is limited by the need to pass through the point openings in writing instruments and by the requirement to form stable suspensions that do not settle over time. The smallest dimension of the graphite particles is selected to limit penetration of the particles into the interstices of the substrate material. The flake-like morphology of the graphite particles results in a "leafing" phenomenon wherein the particles lie flat and align horizontally on the surface of the substrate material, overlapping each other, without penetrating into the interstices of the substrate. Such leafing particles are easily erased, whereas particles in the interstices generally are not. Graphite particles having a spherical or cube-like morphology tend not to exhibit this leafing tendency, which can reduce erasability as well as deleteriously affect the laydown properties of the erasable, shear-thinning writing compositions. Highly structured carbon black particles also exhibit a tendency to penetrate into the interstices of the substrate. Examples of suitable graphite particles include, but are not limited to, those sold under the tradenames, Micro750 and Micro790 (flake), Micro150 and Micro190 amorphous), Micro250 and Micro290 (primary synthetic), and Micro450 and Micro490 (secondary synthetic), available from Graphite Mills, Inc. (Asbury Graphite Mills, N.J.)

Because of the flexibility of the graphite particles, the deposited writing compositions form elastic films on drying. The integrity of these films is strong enough to prevent flaking when the paper substrate is bent or folded. As a result of the inherent elastic nature of the films, the shear-thinning writing compositions according to the invention do not normally need an agent specifically for forming films. Nonetheless, a small amount of film-forming can be added if smudging of the written material is a concern. Smudging tends to increase with increasing laydown and with increasing particle size. However, as the concentration of film-forming agent increases, the erasability of the writing composition decreases. Eventually, enough film-forming agent can be added to the writing composition to make it non-erasable. Examples of suitable film-forming agents for use in the writing compositions according to the invention include, but are not limited to, acrylic copolymers such as Avalure AC 120 and Avalure 122, and polyurethane dispersions, such as Avalure UR 425 and Avalure 450, all of which are available from B F Goodrich Performance Materials, Cleveland, Ohio.

Other Pigment Particles:

"Graphite-color pigments," which are flake-like pigments that provide graphite-like color, can also successfully be used in the erasable, shear-thinning writing compositions according to the invention. Typically, such pigments have been surface-modified by chemical reaction, or by adsorption, or by coating with other colorants (pigments and/or dyes.) Examples of graphite-color pigments that can be used in the compositions according to the invention include, but are not limited to, aluminum flakes, mica flakes, and bismuth oxychloride flakes. Suitable aluminum flakes include, for example, Metalure, Alucolor (organic pigment/ aluminum), and Aloxal (aluminum with oxidized surface), available from Eckart America, L. P., Painesville, Ohio. Suitable mica flakes include, for example, Black Mica (iron oxide, titanium dioxide/mica), Micronasphere M (silica/ mica), Colorona Blackstar Blue (iron oxide/mica), Microna Matte Blue (ferric ferrocyanide/mica), and Afflair 110 (titanium dioxide/mica), available from EM Industries, Inc., Hawthorne, N.Y. Suitable bismuth oxychloride flakes include, for example, Biron ESQ and Biron LF-2000, also available from EM Industries, Inc. A dark pigment must be mixed with Alucolor, Aloxal, Micronasphere M, Afflair 110, Biron ESQ, and Biron LF-2000 in order to achieve the desired graphite color. The presence of some of these pigments, such as Afflair 110, in the compositions according to the invention provides a pearlescent sheen to the surface of the deposited writing composition.

Aqueous Solvent System:

The aqueous solvent system of the erasable, shear-thinning writing composition is a polar solvent system in which water is the primary solvent. The aqueous solvent system can consist of water alone, but other water-soluble organic solvents which are useful in inhibiting drying in the point of the writing instrument and in preventing the shear-thinning writing composition from freezing at low temperatures can be included in the aqueous solvent system. Typically, the shear-thinning writing composition includes from 1 percent by weight to 40 percent by weight of a water-soluble organic solvent. Preferably, the shear-thinning writing composition includes 5 percent by weight to 30 percent by weight of a water-soluble organic solvent. Most preferably, the shear-thinning writing composition includes about 8 percent by weight to 25 percent by weight of a water-soluble organic solvent. If too much water-soluble organic solvent is added to the shear-thinning writing composition, the written marks take longer to dry, have worse erasability, exhibit poorer writing characteristics (uneven line intensity), and the solubility of the shear-thinning agent in the formulation may be affected.

The aqueous solvent system can be described in terms of the ratio of water to water-soluble organic solvent. For example, the polar solvent system can be a 1:1 mixture of water and a water-soluble organic solvent. Typically, the ratio of water to water-soluble organic solvent is from about 0.5 part to about 25 parts water per part of organic solvent(s). Preferably, the ratio of water to water-soluble organic solvent is from about 1 part to about 20 parts water per part of organic solvent(s). Most preferably, the ratio of water to water-soluble organic solvent is from about 2 parts to about 10 parts water per part of organic solvent(s). In general, preferred ratios of water to water-soluble organic solvents lead to better erasability and writing characteristics such as even laydown and line intensity.

Examples of water-soluble organic solvents include, but are not limited to, glycols, polyhydric alcohols, glycol ethers, glycol ether esters, amines, amides, and alkanolamides. Other examples of water-soluble organic solvents can be found in McCutcheon's Volume 2: Functional Materials, North American Edition; McCutcheon's Division, The Manufacturing Confectioner Publishing Co., Glen Rock, N.J. (1998), the disclosure of which is herein incorporated by reference. Examples of glycols include, but are not limited to, ethylene glycol, diethylene glycol, propylene glycol, triethylene glycol, polyethylene glycol, and polypropylene glycol. Examples of polyhydric alcohols include, but are not limited to, sorbitol, glycerol, diglycerol, and triglycerol. Examples of glycol ethers include, but are not limited to, ethylene glycol monophenyl ether, diethylene glycol monomethyl ether, propylene glycol monomethyl ether, and dipropylene glycol monomethyl ether. An example of a suitable glycol ether ester is, but is not limited to, propylene glycol monomethyl ether acetate. Examples of amines include, but are not limited to, ethanolamine, diethanolamine, and triethanolamine. Examples of amides include, but are not limited to, urea and thiourea. Examples of alkanolamides include, but are not limited to, Acetamide MEA (Witco Corporation, Greenwich, Conn.) and Schercomid AME-70 (Scher Chemicals, Inc., Clifton, N.J.).

Dispersants:

Additionally, the density and the size of the graphite and other pigment particles in the writing composition necessitate the use of one or more effective dispersants to disperse the particles into the shear-thinning writing composition. Typically, such dispersants are water-soluble polymers that include polymeric chains having "anchoring groups" which may or may not carry a charge, and which are attracted to the graphite and/or pigment particulate surface. When the unbound portion of the polymeric chain is well solvated, it helps to stabilize the dispersion of particles in the solvent system. Dispersants are also used to reduce the drying times of the erasable, shear-thinning composition. Typically, the shear-thinning writing composition includes about 0.01 percent by weight to 5 percent by weight of one or more suitable dispersants; preferably, between about 0.02 percent by weight to 4 percent by weight of one or more dispersants; and most preferably, between about 0.05 percent by weight and 2 percent by weight of one or more dispersants. Compositions not containing sufficient amounts of one or more dispersants may show poor writing performance (reduced or no flow from the point), and may exhibit poor stability with time and/or elevated temperature.

Examples of suitable dispersants include, but are not limited to, nonionic copolymers such as Disperbyk-192 (BYK-Chemie USA, Inc., Wallingford, Conn.), anionic copolymers such as Disperbyk-190 and Disperbyk-191 (BYK-Chemie USA, Inc., Wallingford, Conn.), anionic phosphated alkoxylated polymers such as Solsperse 40000 and Solsperse 41090 (Avecia Pigments & Additives, Charlotte, N.C.), anionic dimethicone copolyol phosphates such as Pecosil PS-100 and Pecosil PS-150 (Phoenix Chemical, Inc., Somerville, N.J.) and other polymers such as Zephrym PD2434, Zephrym PD2630, Zephrym PD2678, and Zephrym PD3076, available from Uniquema, Wilmington, Del.

Wetting Agents:

In order to produce a consistent written line, the formulation must readily wet the ball of the writing instrument. Furthermore, the formulation must also wet the paper so that written marks dry fast by absorption of the solvent into the paper. Preferred wetting agents can be either anionic or nonionic. Typically, the shear-thinning writing composition includes about 0.01 percent by weight to 5 percent by weight of one or more suitable wetting agents; preferably, between about 0.02 percent by weight to 4 percent by weight of one or more wetting agents; and most preferably, between about 0.05 percent by weight and 2 percent by weight of one or more wetting agents.

Examples of suitable wetting agents include, but are not limited to, anionic phosphate esters such as Ethfac 324 and Ethfac 361 (Ethox Chemical, LLC, Greenville, S.C.), anionic sulfosuccinates such as Emcol 4100M (Witco Corporation, Greenwich, Conn.) and Triton GR-5M (Union Carbide Corporation, Danbury, Conn.), nonionic ethoxylated fatty acids such as Emerest 2634 and Emerest 2646 (Cognis Corporation, Cincinnati, Ohio), nonionic ethoxylated alcohols such as Brij 58, Brij 98, Renex 20, Renex 36 and Synthrapol KB (Uniquema, Wilmington, Del.), and nonionic polyether-modified polydimethylsiloxanes such as BYK-345, BYK-348, BYK-307 and BYK-333 (BYK-Chemie USA, Inc., Wallingford, Conn.).

Preservatives:

Shear-thinning writing compositions thickened with polysaccharide gums require the use of one or more preservatives to prevent the growth of bacteria and fungi. Preferred compounds have an active moiety which is anionic. The preferred agent is a broad-spectrum biocide, 1,2,-benzisothiazolin-3-one, sold as a solution or dispersion under the tradename Proxel. Examples of suitable preservatives include, but are not limited to, Proxel GXL, Proxel BD20, and Proxel XL2 (Avecia Biocides, Wilmington, Del.) Typically, the shear-thinning writing compositions according to the invention can include 0.01 percent by weight to 0.05 percent by weight of the active ingredient in the preservative product. Other preservatives include, but are not limited to, potassium sorbate, sodium benzoate, pentachlorophenyl sodium, and sodium dihydroacetate.

Other Additives:

The shear-thinning writing compositions according to the invention can also include other additives that are well-known in the art, such as defoamers, corrosion inhibitors, and lubricants.

Additionally, the pH of the composition can be adjusted to increase the stability and writing characteristics of the writing composition. For example, the stability of erasable, shear-thinning writing compositions may be enhanced by adjusting the pH of the composition to between about 5 and about 9, e.g., by adding an acid or a base. More preferably, the pH of the graphite writing composition is between about 7 and about 9 and, most preferably, the pH of the graphite writing composition is between about 7 and about 8.

Writing Instruments:

Suitable writing instruments to deliver the erasable, shear-thinning compositions include, but are not limited to, conventional ballpoint pens. The tip of a ballpoint pen suitable for use with compositions according to the invention has a ball having a diameter between 0.3 mm and 2.0 mm. The ball is in direct contact with a fluid reservoir containing the writing composition. The clearance between the point opening and the ball must be of sufficient size to allow the graphite particles of the erasable, shear-thinning writing compositions according to the invention to pass through the point. Preferably, the clearance is at least about 100 microns; more preferably, at least about 25 microns. The ball is made from a group of materials which includes sintered hard alloys, ceramics, and resins. The point material is selected from materials including stainless steel, nickel silver, brass, and molded resins. The point can also contain a spring which contacts the ball and presses it against the inner edge of the front of the point until the force of writing pushes the ball back. Such ballpoint pens having a spring are described in U.S. Pat. No. 5,929,135, the entire disclosure of which is herein incorporated by reference. Other examples of ballpoint pens (without springs) which may be used with the writing composition are the PaperMate Gel Stick pen (Sanford, Bellwood, Ill.) and the uni-ball Signo gel ink pen (Mitsubishi Pencil Co., Ltd., Japan).

The invention can be better understood in light of the following examples which are intended as an illustration of the practice of the invention and are not meant to limit the scope of the invention in any way.

EXAMPLE 1

An erasable, shear-thinning composition was produced as follows: 2.0 g of Micro750 graphite particles (Asbury Graphite Mills, Asbury, N.J.), 24 g water, 1 g propylene glycol (Fisher Scientific, Pittsburgh, Pa.), 0.25 g of Carbopol 934 shear-thinning additive (B F Goodrich, Cleveland, Ohio), and 2 g of Zephrym PD2678 dispersant (Uniquema, Wilmington, Del.) were blended in a homogenizer at 15,000 rpm for about 15 minutes to disperse the graphite particles and shear-thinning agent in the solvent mixture system.

The homogenized composition was loaded into a PaperMate Gel Stick pen having a 0.7-mm point which includes a clearance sufficiently large to allow the graphite particles to pass through the point.

EXAMPLE 2

The erasability and intensity of the shear-thinning writing composition produced in Example 1 were tested using the following procedure.

A trace was applied to the substrate by a standard writing test method in which the paper was advanced beneath a writing instrument at a rate of 245 mm/min. PaperMate Gel Stick pens produced in Example 1 were used, with a loading of 50 g at a 60-degree angle relative to the substrate surface, to produce five separate markings on 60-lb paper. The paper was removed and placed on an erasing instrument including an erasing head provided with a Sanford Corporation (Bellwood, Ill.) Pink Pearl pencil eraser #101 (Shore A34 hardness, ASTM D 2240). The erasing head was applied under a load of 380 grams to the paper bearing the trace. The eraser had a surface measuring 7 mm by 3 mm. The erasing head reciprocated at a rate of 75 cycles per minute, the length of each stroke being 50 mm. Each trace was subjected to 25 cycles of erasing which can be visually observed or rated by photometer readings (MacBeth PCM II reflectometer). Once a trace had been applied to the substrate with the writing instrument, the applied trace was left to air dry at room temperature for about five minutes prior to erasing the trace with the erasing head.

The results of the erasability and intensity were 93.2% and 51.7%, respectively.

EXAMPLE 3

Another erasable, shear-thinning writing composition was produced as follows: a 4-oz. glass jar was charged with 2 g of graphite Micro750 (Asbury Graphite Mills, Asbury, N.J.), 24 g of deionized water, 1 g propylene glycol (Fisher Scientific, Pittsburgh, Pa.), 0.25 g Carbopol 934 (B F Goodrich, Cleveland, Ohio), and 2.0 g Zephrym PD2678 dispersant (Uniquema, Wilmington, Del.). The mixture was then agitated with an overhead mechanical stirrer for about 30 minutes followed by homogenization at 15,000 rpm for about 15 minutes.

The homogenized composition was loaded into a Paper-Mate Gel Stick pen having a 0.7-mm point which includes a clearance sufficiently large to allow the graphite particles to pass through the point.

EXAMPLE 4

The time dependence of the erasability of the shear-thinning writing composition produced in Example 3 was tested using the above-described procedure as follows: PaperMate Gel Stick pens produced in Example 3 were used, with a loading of 100 g at a 60-degree angle, to produce a single, 2-inch-long marking on 60-lb paper. One portion of the marking (Marking 1) was erased with a standard eraser (Pink Pearl available from Sanford Corporation, Bellwood, Ill.) immediately after making the marking on the paper. Four additional, separate portions of the marking (Markings 2–5) were successively erased at 5-minute intervals. The erasability of each erased portion of the marking was measured according to the above-mentioned procedure.

The erasability of the portion of the marking erased immediately after making the marking on the paper (Marking 1) was 67%. The erasability of the portion of the marking erased after 5 minutes (Marking 2) was 83%. The erasability of the remaining erased portions of the marking (Markings 3, 4, and 5) was about 83%.

EXAMPLE 5

Seven additional erasable, shear-thinning writing compositions (Compositions 1–7) were produced as described below.

Composition 1

A 4-oz. glass jar was charged with 4 g of propylene glycol (Fisher Scientific, Pittsburgh, Pa.), 0.25 g Carbopol 940 (B F Goodrich, Cleveland, Ohio), and 35 g of deionized water. The mixture was then agitated with an overhead mechanical stirrer at 1000 rpm for about 20 minutes, after which 0.3 g Zephrym PD 2678 (Uniquema, Wilmington, Del.) was added. The resulting mixture was mixed for an additional 5 minutes after which 1.0 g of Afflair 110 pearl pigment (EM Industries, Inc., Hawthorn, N.Y.) was added to the mixture. The resulting mixture was agitated for an additional 10 minutes and then homogenized using a T-25 IKA Labortechnik homogenizer at 15,000 rpm for 5 minutes. After initial homogenization, 0.26 g defoamer Surfynol DF 110D (Air Products, Allentown, Pa.) was added, and the resulting mixture was stirred for 10 minutes. 0.25 g of Ethfac 361 (Ethox Chemicals, LLC, Greenville, S.C.) was added to the mixture which was mixed for an additional 10 minutes. 3.0 g of graphite Micro750 (Asbury Graphite Mills, Asbury, N.J.) was added to the mixture which was further mixed for 15 minutes and then homogenized for 20 minutes to produce an erasable, shear-thinning writing composition.

The viscosity of Composition 1 was measured three times according to the described procedure. The average viscosities were about 4,040 mPa·sec at 1.0 $\sec^{-1}$ and about 74 mPa·sec at 1,000 $\sec^{-1}$. The power law model was fit to the data to give K=3.18 and n=0.46.

Composition 2

A 4-oz. glass jar was charged with 8 g of propylene glycol (Fisher Scientific, Pittsburgh, Pa.), 0.21 g Carbopol 940 (B F Goodrich, Cleveland, Ohio), and 45.2 of deionized water. The resulting mixture was agitated with an overhead mechanical stirrer at 1000 rpm for about 20 minutes after which 0.25 g Zephrym PD 2678 (Uniquema, Wilmington, Del.) was added to the mixture. The resulting mixture was mixed for an additional 5 minutes after which 1.0 g of Afflair 110 pearl pigment (EM Industries, Inc., Hawthorn, N.Y.) was added to the mixture. The resulting mixture was agitated for an additional 10 minutes and then homogenized using a T-25 IKA Labortechnik homogenizer at 15,000 rpm for 5 minutes. After initial homogenization, 0.26 g defoamer Surfynol DF 110D (Air Products, Allentown, Pa.) was added to the mixture which was then stirred for 10 minutes. 0.38 g of Ethfac 361 (Ethox Chemicals, LLC, Greenville, S.C.) was added to the mixture, and the resulting mixture was further mixed for an additional 10 minutes. 3.0 g of graphite Micro750 (Asbury Graphite Mills, Asbury, N.J.) was added to the mixture, and the resultant mixture was further mixed for 15 minutes and then homogenized for about 20 minutes to produce an erasable, shear-thinning writing composition.

The viscosity of Composition 2 was measured three times according to the described procedure. The average viscosities were about 1500 mPa·sec at 1.0 $\sec^{-1}$ and about 49 mPa·sec at 1000 $\sec^{-1}$. The power law model was fit to the data to give K=1.12 and n=0.56.

Composition 3

A 4-oz. glass jar was charged with 8 g of propylene glycol (Fisher Scientific, Pittsburgh, Pa.), 0.21 g Carbopol 940 (B F Goodrich, Cleveland, Ohio), and 50 g of deionized water. The resulting mixture was agitated with an overhead mechanical stirrer at 1000 rpm for about 20 minutes, and then 0.22 g Zephrym PD 2678 (Uniquema, Wilmington, Del.) was added to the mixture. The resulting mixture was mixed for an additional 5 minutes after which 1.0 g of Afflair 110 pearl pigment (EM Industries, Inc. Hawthorn, N.Y.) was added. The resulting mixture was agitated for an additional 10 minutes and then homogenized using a T-25 IKA Labortechnik homogenizer at 15,000 rpm for 5 minutes. After initial homogenization, 0.27 g defoamer Surfynol DF 110 D (Air Products, Allentown, Pa.) was added to the mixture. The resulting mixture was stirred for 10 minutes after which 0.4 g of Ethfac 361 (Ethox Chemicals, LLC, Greenville, S.C.) was added to the mixture which was further mixed for an additional 10 minutes. 3.0 g of graphite Micro750 (Asbury Graphite Mills, Asbury, N.J.) was added, and the resulting mixture was mixed for 15 minutes and then homogenized for 20 minutes to produce an erasable, shear-thinning writing composition.

The viscosity of Composition 3 was measured three times according to the described procedure. The average viscosities were about 1,400 mPa·sec at 1.0 sec$^{-1}$ and about 44 mPa·sec at 1000 sec$^{-1}$. The power law model was fit to the data to give K=1.17 and n=0.53.

Composition 4

A 4-oz. glass jar was charged with 8 g of propylene glycol (Fisher Scientific, Pittsburgh, Pa.), 0.20 g Carbopol 940 (B F Goodrich, Cleveland, Ohio), and 50 g of deionized water. The resulting mixture was agitated with an overhead mechanical stirrer at 1000 rpm for about 20 minutes after which 0.25 g Zephrym PD2678 (Uniquema, Wilmington, Del.) was added to the mixture. The resulting mixture was mixed for an additional 5 minutes after which 0.27 g defoamer Surfynol DF 110 D (Air Products, Allentown, Pa.) was added to the mixture. The resulting mixtures was stirred for 10 minutes after which 0.4 g of Ethfac 361 (Ethox Chemicals, LLC, Greenville, S.C.) was added to the mixture. The resulting mixture was mixed for an additional 10 minutes after which 3.0 g of graphite Micro750 (Asbury Graphite Mills, Asbury, N.J.) was added to the mixture. The resulting mixture was mixed for 15 minutes and then homogenized using a T-25 IKA Labortechnik homogenizer at 15,000 rpm for 20 minutes to produce an erasable, shear-thinning writing composition.

The viscosity of Composition 4 was measured three times according to the described procedure. The average viscosities were about 367 mPa·sec at 1.0 sec$^{-1}$ and about 18 mPa·sec at 1000 sec$^{-1}$. The power law model was fit to the data to give K=0.18 and n=0.67.

Composition 5

A 4-oz. glass jar was charged with 0.25 g Carbopol 934 (B F Goodrich, Cleveland, Ohio) and 46 g of deionized water. The mixture was agitated with an overhead mechanical stirrer at 1000 rpm for about 20 minutes after which 0.25 g Zephrym PD2678 (Uniquema, Wilmington, Del.) was added to the mixture. The resulting mixture was further mixed for an additional 5 minutes after which 0.25 g defoamer Surfynol DF 110D (Air Products, Allentown, Pa.) was added to the mixture. The resulting mixture was stirred for 10 minutes after which 0.25 g of Ethfac 361 (Ethox Chemicals, LLC, Greenville, S.C.) was added to the mixture. The resulting mixture was mixed for an additional 10 minutes after which 3.0 g of graphite Micro750 (Asbury Graphite Mills, Asbury, N.J.) was added to the mixture. The resulting Mixture was mixed for 15 minutes and then homogenized using a T-25 IKA Labortechnik homogenizer at 15,000 rpm for 30 minutes to produce an erasable, shear-thinning writing composition.

The viscosity of Composition 5 was measured three times according to the described procedure. The average viscosities were about 1,700 mPa·sec at 1.0 sec$^{-1}$ and about 51 mPa·sec at 1000 sec$^{-1}$. The power law model was fit to the data to give K=1.32 and n=0.54.

Composition 6

A 4-oz. glass jar was charged with 0.12 g Carbopol 940 (B F Goodrich, Cleveland, Ohio) and 43.6 g of deionized water. The resulting mixture was agitated with an overhead mechanical stirrer at 1000 rpm for about 20 minutes after which 0.58 g Zephrym PD2678 (Uniquema, Wilmington, Del.) was added to the mixture. The resulting mixture was further mixed for an additional 5 minutes after which 0.25 g defoamer Surfynol DF 110D (Air Products, Allentown, Pa.) was added to the mixture. The resulting mixture was stirred for 10 minutes after which 0.5 g of Ethfac 361 (Ethox Chemicals, LLC, Greenville, S.C.) was added to the mixture. The resulting mixture was mixed for an additional 10 minutes after which 3.0 g of graphite Micro750 (Asbury Graphite Mills, Asbury, N.J.) was added to the mixture. The resulting mixture was mixed for 15 minutes and then homogenized using a T-25 IKA Labortechnik homogenizer at 15,000 rpm for 30 minutes to produce an erasable, shear-thinning writing composition.

The viscosity of Composition 6 was measured three times according to the described procedure. The average viscosities were about 593 mPa·sec at 1.0 sec$^{-1}$ and about 24 mPa·sec at 1000 sec$^{-1}$. The power law model was fit to the data to give K=0.31 and n=0.63.

Composition 7

A 4-oz. glass jar was charged with 8 g of propylene glycol (Fisher Scientific, Pittsburgh, Pa.), 0.23 g Kelzan xanthan gum (Kelco Biopolymers, San Diego, Calif.), and 50.0 g of deionized water. The resulting mixture was agitated with an overhead mechanical stirrer at 1000 rpm for about 20 minutes after which 0.25 g Zephrym PD2678 (Uniquema, Wilmington, Del.) was added to the mixture. The resulting mixture was mixed for an additional 5 minutes after which 1.0 g of Afflair 110 pearl pigment (EM Industries, Inc. Hawthorn, N.Y.) was added to the mixture. The resulting mixture was agitated for an additional 10 minutes and then homogenized using a T-25 IKA Labortechnik Homogenizer at 15,000 rpm for 5 minutes. After initial homogenization, 0.27 g defoamer Surfynol DF 110D (Air Products, Allentown, Pa.) was added to the mixture which was then stirred for 10 minutes. 0.25 g of Ethfac 361 (Ethox Chemicals, LLC, Greenville, S.C.) was added to the mixture, and the resulting mixture was further mixed for an additional 10 minutes. 3.0 g of graphite Micro750 (Asbury Graphite Mills, Asbury, N.J.) was added to the mixture, and the resultant mixture was further mixed for 15 minutes and then homogenized for about 20 minutes to produce an erasable, shear-thinning writing composition.

The viscosity of Composition 7 was measured three times according to the described procedure. The average viscosities were about 3,270 mPa·sec at 1.0 sec$^{-1}$ and about 14 mPa·sec at 1000 sec$^{-1}$. The power law model was fit to the data to give K=2.26 and n=0.25.

In the erasable, shear-thinning writing compositions described above, Surfynol DF 110D, a diol mixture, is a defoamer and deagglomerant, and Ethfac 361 is a dispersant. Typically, the ratio of Surfynol DF 110D to Ethfac 361 should be between about 0.5 and about 2.5.

EXAMPLE 6

Compositions 5 and 6 were loaded into separate Paper-Mate Gel Stick pens having a 0.7-mm point to produce writing instruments (Instrument 1 and Instrument 2, respectively). Composition 5 was also loaded into a Paper-Mate Gel Stick pen having a 0.5-mm point to produce a writing instrument (Instrument 3). Each point of the Paper-Mate Gel Stick pen includes a clearance sufficiently large to allow the graphite particles to pass through the point.

The erasability and intensity of Compositions 5 and 6, produced in Example 5, were tested using the above-described procedures as follows: Instruments 1–3 were used, with a loading of 55 g at a 60-degree angle relative to the substrate surface, to produce five separate markings on 60-lb paper. A standard eraser (Pink Pearl available from Sanford Corporation, Bellwood, Ill.) was used, with a loading of 380 g, to erase about one inch of each marking.

The results of erasability and intensity are summarized below in Table 1. For comparison, markings produced from an American 2HB wood pencil (Pencil 1), available from Eberhard Faber, Inc., located in Oakville, Ontario, sharpened to a point of about 0.7 mm, and a Clickster mechanical pencil having a 0.7-mm No. 2 lead (Pencil 2), available from Sanford Corporation, under the same conditions described above are also included in Table 1.

TABLE 1

Erasability and Intensity Test Results

| Writing Instrument | Point Size, mm | Erasability (%) | Intensity (%) |
| --- | --- | --- | --- |
| Instrument 1 | 0.7 | 81 | 78 |
| Instrument 2 | 0.7 | 83 | 79 |
| Instrument 3 | 0.5 | 89 | 76 |
| Pencil 1 | ~0.7 | 96 | 39 |
| Pencil 2 | 0.7 | 96 | 63 |

EXAMPLE 7

The line uniformity of the writing instruments were tested by the above-described procedure as follows: Composition 1 produced above in Example 5 was loaded into a PaperMate Gel Stick pen having a 0.7-mm point to produce a writing instrument (Instrument 4). Instruments 1–3 produced in Example 6 and Instrument 4 were used, with a loading of 55 g at a 60-degree angle relative to the substrate surface, to produce a 65-inch-long marking on 60-lb paper. The reflectance was measured from each marking Measurements at 1-inch intervals along the length of the marking. Each measured reflectance was converted into a percent intensity by using the formula set forth previously. The average percent intensity and standard deviation of the percent intensity (i.e., the line uniformity) were calculated based on the calculated intensities for each marking.

The results of line uniformity are summarized below in Table 2. For comparison, markings produced under the same conditions described above from Pencils 1 and 2, as well as markings produced from a Pentel mechanical pencil having a 0.5-mm HB lead (Pencil 3) and a Tombow mechanical pencil having a 0.5-mm HB lead (Pencil 4), are also included in Table 2.

TABLE 2

Line Uniformity Test Results

| Writing Instrument | Point Size mm | Average Intensity % | Standard Deviation of Percent Intensity |
| --- | --- | --- | --- |
| Instrument 1 | 0.7 | 77 | 1.9 |
| Instrument 2 | 0.7 | 75 | 2.3 |
| Instrument 3 | 0.5 | 75 | 2.0 |
| Instrument 4 | 0.7 | 73 | 1.8 |
| Pencil 1 | ~0.7 | 28 | 7.0 |
| Pencil 2 | 0.7 | 50 | 12.6 |
| Pencil 3 | 0.5 | 37 | 11.0 |
| Pencil 4 | 0.5 | 42 | 10.0 |

The results in Table 2 demonstrate that in the testing performed in Example 7, the erasable, shear-thinning writing compositions exhibited higher line uniformity (lower standard deviation of the percent intensity) and higher line intensity compared with wood and mechanical pencils.

EXAMPLE 8

Samples were formulated in small quantities of 15–30 mL according to the component weight percentages listed in Table 3. The mixing procedure was performed by first combining all ingredients except the propylene glycol, xanthan gum and 2 mL of the total water in a 50 mL polypropylene centrifuge tube. The tube was capped and was manually shaken. The tube was then horizontally attached to a Vortex-Genie 2 mixer (Fisher Scientific Company, Pittsburgh, Pa.) for five minutes of high-speed vortexing. The propylene glycol and xanthan gum were combined in a second tube. The second tube was manually shaken to ensure that the xanthan gum was dispersed in the propylene glycol. After five minutes of high-speed vortexing, the contents of the first tube were added to the second tube. The remaining 2 mL of water was added to the first tube, which was recapped and shaken well. This rinse water of the first tube was then added to the second tube. The second tube was capped, shaken by hand, and then attached horizontally to the mixer apparatus. For a 15 mL sample, the tube was first vortexed for 5 minutes, at which point the mixing was interrupted to scrape the sides with a Pasteur pipette. The tube was subsequently vortexed for 10 additional minutes. For a 30 mL sample, the tube was first vortexed for 10 minutes, at which point the mixing was interrupted to scrape the sides with a Pasteur pipette. The tube was subsequently vortexed for 15 additional minutes. After the vortexing was completed, the tube was placed in a centrifuge (IEC PR-7000M centrifuge, International Equipment Company, Needham Heights, Mass.) and spun at 100 G for 1.5 minutes to help release air bubbles. This procedure was repeated up to 3 additional times, as needed. The tube was then left undisturbed for a period of time not exceeding 24 hours. Before the shear-thinning composition was used, the tube was placed in an ultrasonic cleaner (Model FS60, Fisher Scientific Company, Pittsburgh, Pa.) for approximately 30 seconds.

In the formulations set forth in Table 3, the graphite particles used were Micro790 (Asbury Graphite Mills, Inc. Asbury, N.J.) from batch M790-2 described in Example 10, the shear-thinning additive was xanthan gum (Keltrol CG, Kelco Biopolymers, San Diego, Calif.), the dispersant was Disperbyk-192 (BYK-Chemie USA Inc., Wallingford, Conn.), and the wetting agents were BYK-345 (BYK-Chemie USA Inc., Wallingford, Conn.) and Emerest 2646 (Cognis Corporation, Cincinnati, Ohio), the preservative was Proxel GXL (19.3 weight percent solution in dipropylene glycol and water) (Avecia Biocides, Wilmington, Del.), the water-soluble organic solvent was glycerol and/or propylene glycol (both available from Fisher Scientific Company, Pittsburgh, Pa.), and the water was deionized water.

TABLE 3

Formulations for Shear-Thinning Graphite Writing Compositions

Component Weight Percent

| Sample | Graphite | Xanthan Gum | Disperbyk -192 | BYK -345 | Emerest 2646 | Proxel GXL | Glycerol | Propylene Glycol | H$_2$O |
|---|---|---|---|---|---|---|---|---|---|
| A | 10.0 | 0.55 | 0.50 | 0.50 | 0.50 | 0.05 | — | 18.0 | 69.90 |
| B | 10.0 | 0.65 | 0.50 | 0.50 | 0.50 | 0.05 | — | 18.0 | 69.80 |
| C | 10.0 | 0.75 | 0.50 | 0.50 | 0.50 | 0.05 | — | 18.0 | 69.70 |
| D | 10.0 | 0.85 | 0.50 | 0.50 | 0.50 | 0.05 | — | 18.0 | 69.60 |
| E | 10.0 | 0.55 | 0.50 | 0.50 | 0.50 | 0.05 | — | 12.0 | 75.90 |
| F | 10.0 | 0.85 | 0.50 | 0.50 | 0.50 | 0.05 | — | 12.0 | 75.60 |
| G | 10.0 | 0.55 | 0.50 | 0.50 | 0.50 | — | — | 18.0 | 69.95 |
| H | 10.0 | 0.55 | 0.50 | 0.50 | 0.50 | — | 8.0 | 10.0 | 69.95 |
| I | 10.0 | 0.55 | 0.50 | 0.50 | 0.50 | — | — | 22.0 | 65.95 |
| J | 10.0 | 0.55 | 0.50 | 0.50 | 0.50 | — | 4.0 | 18.0 | 65.95 |

EXAMPLE 9

The apparent viscosity ($\mu$) of each sample was determined at 25° C. with a Carri-Med CSL$^2$-500 Rheometer (TA Instruments, New Castle, Del.). The instrument used a cone-and-plate geometry with a stainless steel cone having a 4-cm diameter and a 2-degree angle. A small amount of sample (0.7 mL) was sheared within a 69 micron gap at a shear rate ($\gamma$) ramping between 0.05 and 1000 sec$^{-1}$ in 3 minutes. The shear stress ($\tau$) was determined from the torque required to drive the cone, and the apparent viscosity was calculated from $\mu=\tau/\gamma$ where $\mu$ is in units of Pa·sec, $\tau$ is in N·m$^{-2}$, and $\gamma$ is in sec$^{-1}$.

For each sample, the measured viscosities were fit to the shear rates using the two parameter Ostwald-de Waele or power law model $\mu=K\gamma^{n-1}$ where n is the flow behavior index (or a shear-thinning index when n<1) and K is the power law coefficient (kg·m$^{-1}$·sec$^{n-2}$). The power law model provides a good fit for shear-thinning fluids (n<1) at intermediate shear rates over a a range of one to two orders of magnitude. The model does not describe viscosity well at very low or very high shear rates.

After examination of the data for the samples of Table 3, the power law model was fit to the viscosities between shear rates of 1.0 sec$^{-1}$ and 100 sec$^{-1}$. The resulting values of K and n are given in Table 4, together with the calculated values of apparent viscosity for shear rates of 1.0 sec$^{-1}$, 30 sec$^{-1}$, and 100 sec$^{-1}$. R-squared values were better than 0.999 for all regressions set forth in Table 4.

TABLE 4

| | Power Law Parameters | | | | |
|---|---|---|---|---|---|
| | K Power Law Coefficient | n Shear-thinning | Viscosity (mPa · sec) | | |
| Sample | (kg · m$^{-1}$ · s$^{n-2}$) | Index | 1.0 sec$^{-1}$ | 30 sec$^{-1}$ | 100 sec$^{-1}$ |
| A | 7.93 | 0.149 | 7930 | 439 | 157 |
| B | 9.50 | 0.150 | 9500 | 528 | 190 |
| C | 10.8 | 0.153 | 10,800 | 608 | 219 |
| D | 11.9 | 0.159 | 11,900 | 685 | 249 |
| E | 7.10 | 0.160 | 7100 | 408 | 148 |
| F | 11.6 | 0.156 | 11,600 | 659 | 239 |
| G | 7.63 | 0.162 | 7630 | 441 | 161 |
| H | 7.80 | 0.160 | 7800 | 448 | 163 |
| I | 8.10 | 0.155 | 8100 | 457 | 165 |
| J | 8.35 | 0.158 | 8350 | 477 | 173 |

EXAMPLE 10

Flake graphite was obtained as Micro790 from Asbury Graphite Mills, Inc. (Asbury, N.J.). The material was characterized by a Coulter LS 230 particle size analyzer (Beckman Coulter, Inc., Fullerton, Calif.), and the results are identified as Micro790 in Table 5. The graphite had an average diameter of 9.7 microns (std. dev.=5.7 microns), with 3.3% by volume less than 1.0 micron and 3.4% by volume greater than or equal to 20.7 microns. The largest particle was detected at (48<53) microns. A writing composition made from this graphite was not readily erasable, and the writing quality and stability of the composition were not good.

In an effort to narrow the size distribution of the particles, two different batches of Micro790 were sent to Hosokawa Micron Powder Systems (Summit, N.J.) for air classification. The subsequent particle size analyses are shown in Table 5 as M790-1 and M790-2. For both batches, the resulting distributions were tighter, with fewer particles below 1.0 micron and above 20.7 microns.

TABLE 5

Coulter LS 230 Graphite Particle Size Analyses

| Graphite Sample | Diameter, microns | | Volume % | | | Maximum Diameter, microns |
|---|---|---|---|---|---|---|
| | Volume Average Diameter | Standard Deviation | <1.0 micron | <2.0 microns | ≧20.7 microns | |
| Micro790 | 9.7 | 5.7 | 3.3 | 3.5 | 3.4 | 48 < 53 |
| Micro790-1 | 10.0 | 4.9 | 1.5 | 2.6 | 2.6 | 36 < 40 |
| Micro790-2 | 7.8 | 3.7 | 1.9 | 2.2 | 0.1 | 23 < 25 |

Graphite samples M790-1 and M790-2 were further observed by optical microscope (Eclipse ME600, Nikon Corporation, Japan) under transmitted light at a magnification of 400×. Microscope slides were prepared from dispersions of the particles, and the particles in the resulting images were characterized by image analysis (Optimas Version 6.2, Media Cybernetics, Silver Spring, Md.). The results are summarized in Table 6.

TABLE 6

Image Analysis of Particle Sizes of Graphite

| Graphite | Total Number Particles Counted | Diameter (from area measurement, assuming circle) | | Cumulative Percentage | | | Aspect Ratio | | |
|---|---|---|---|---|---|---|---|---|---|
| | | Average, microns | Standard Deviation, microns | ≦1.0 micron | ≦2.0 microns | >20.0 microns | Avg | Min | Max |
| M790-1 | 3757 | 5.5 | 4.2 | 12.3 | 29.9 | 0.1 | 1.6 | 1.0 | 7.7 |
| M790-2 | 3870 | 4.6 | 3.1 | 10.8 | 26.8 | 0.0 | 1.6 | 1.0 | 7.7 |

The average diameter and distribution values vary between Tables 5 and 6 because of the different averaging methods used (volume versus number). The diameters in Table 6 are smaller because they are number average diameters and also because the image analysis software digitally separated aggregated particles. However, the general trends are the same between the two tables. Of the two graphite batches, M790-2 had the smaller average diameter and the narrower distribution of particle sizes. The image analysis method also provided information on the aspect ratio (major axis/breadth) of the particles. In both batches, the average aspect ratio was 1.6 with a range from 1.0 to 7.7.

EXAMPLE 11

Writing compositions were made with M790-1 and M790-2 graphite particles. The compositions were similar to Sample G of Table 3. Each sample formulation was made according to the following composition, by weight percent: 10.0% graphite, 0.55% xanthan gum, 0.50% Disperbyk-192, 0.50% BYK-345, 0.50% Emerest 2646, 18.0% propylene glycol, 69.95% water (all components described in Table 3.) The physical properties of the writing compositions are given in Table 7. The results showed that Sample K was acidic with a lower viscosity than the slightly basic Sample L. The viscosity of these samples exhibited repeatability within ±2% of the listed values.

TABLE 7

Physical Properties of Graphite Writing Compositions

| Sample | Graphite | % Solids | pH | Surface Tension (mN/m) | Viscosity at 30 s$^{-1}$ (mPa · s) |
|---|---|---|---|---|---|
| K | M790-1 | 11.7 | 5.1 | 29.0 | 389 |
| L | M790-2 | 11.7 | 7.4 | 30.8 | 411 |

The values in Table 7 were determined as follows:

%Solids. The percentage solids was measured by depositing 0.1 mL of sample into a tared 44-mL aluminum dish on a balance pan. The initial weight ($w_o$) was recorded. The pan was placed in an oven at 50° C. overnight, and the final weight ($w_f$) was recorded the next day. The percentage solids was calculated as: %Solids=([$w_o-w_f$]/$w_o$) multiplied by 100. The reported value was an average of four measurements.

pH. The pH was measured using an Accumet pH/conductivity meter (Model 20, Fisher Scientific Company, Pittsburgh, Pa.) with a pH indicating electrode (AccuTupH, Fisher Scientific Company, Pittsburgh, Pa.).

Surface Tension. Surface tension was determined with a Cahn Dynamic Contact Angle Analyzer (DCA-312, Thermo Orion, Beverly, Mass.) using the DuNouy ring method. The force of break-point was determined with a 5.925-cm circumference platinum-iridium ring drawn through the surface of a 5-mL sample in a 35 mm×10 mm petri dish. Three measurements were taken on each sample and then averaged for the reported surface tension.

Viscosity. Viscosity was measured as described in Example 9. The experimental value at 30 sec$^{-1}$ is given in Table 7 for comparison of the two compositions.

Further testing was done with these samples to evaluate writing quality, erasability, and stability. Pen refills were made using commercial 0.8-mm stainless steel points. About 1 mL of each sample was added by syringe to the open end of a refill tube closed by the point at the other end. A plug of grease (44-21-A, National Ink, Inc., Santee, Calif.) was added on top of the sample. The resulting refill was centrifuged at 300 G for 1.5 minutes prior to use.

Machine and manual writing were done with the refills. The laydown values from the machine testing are given in Table 8, together with subjective evaluations of the writing quality and erasability from both machine and manual testing. Although both samples performed better than the original writing composition made with Micro790, Sample L was better than Sample K in terms of the amount of laydown, writing quality, and subsequent erasability. This was further supported by the results of stability testing at 50° C. for four weeks. While Sample K showed a sharp separation with a clear layer at the top of the sample, Sample L had no visible separation within the bulk of the sample.

TABLE 8

Evaluation of Graphite Writing Compositions

| Sample | Number of Refills | Laydown (mg/m) | Writing Quality | Erasability Rating | Stability at 50° C. After 4 weeks |
|---|---|---|---|---|---|
| K | 2 | 2.0 | Inconsistent Some blobbing | 3 | Clear layer at surface with sharp interface at 83% |
| L | 4 | 2.4 | Consistent | 4 | No visible separation |

The values in Table 8 were determined as follows:

Laydown. The laydown of the refills was measured using a Hutt Testwriter HST-10 (Rudi Hutt, Germany). The writing machine was set to run at 4.5 m/min for the circular motion of the writing plate, 200 mm/min for the paper feed, and a slow speed (1 rpm) for the refill rotation. Each refill was angled at 60 degrees and placed under a 50-g load in addition to the pen holder (about 64 g). The paper was Nekoosa Bond. The refills were weighed at the start ($w_o$) and at the end ($w_f$) of each writing distance (d). The laydown (L) for each segment was calculated as: $L=(w_o-w_f)/d$. In most cases, three 20-m writing segments were completed with each refill, and the reported laydown was the average of the segments. The repeatability was demonstrated to be ±0.1 mg/m.

Writing Quality. Machine traces and manual writing were subjectively evaluated.

Erasability. Erasability was subjectively judged from samples of manual writing which were erased with a Sanford Pink Pearl eraser. The erased section was rated with the scale: 1=very poor, 2=poor, 3=acceptable, 4=good, and 5=very good.

Stability. A volume of sample was pipetted into a 13 mm×100 mm glass tube to a height of 5.0 cm. The vial was capped and then secured with Teflon tape around the gap between the cap and the tube. The vial was placed in an oven at 50° C. and observed at 2- and 4-week intervals. The location of the interface of any clear surface layer was expressed as a percentage and was determined by the following equation: [(Height of liquid−Width of clear layer)/(Height of liquid)] multiplied by 100.

EXAMPLE 12

A test was conducted with thirteen subjects (5 men/8 women) using three writing products to compare the erasability and the line intensity of writing compositions and writing instruments according to the invention with commercially-available writing products. The writing instrument according to the invention contained an erasable, shear-thinning writing composition (Sample G of Table 3) and a 0.8-mm point. The performance of this instrument was compared with the Sanford Mirado pencil (No. 2 HB lead) and the Sanford Clickster mechanical pencil (0.7-mm HB lead). The subjects used each product on a five-minute exercise which included writing 10 sentences and filling in 10 circles. The tracings were analyzed by image analysis.

After the measurements were completed, the exercises were redistributed to thirteen different panelists. Each subject was asked to erase one sentence on each exercise using a Sanford Pink Pearl eraser. The erased section and an adjacent blank section were analyzed by image analysis.

The image analysis system consisted of a light table with 250 W photoflood lamps (Wiko, Orland Park, Ill.), a Sony DCR-VX1000 digital video camera recorder (Sony Corporation, Japan), and Optimas Version 6.5 software (Media Cybernetics, Silver Spring, Md.).

The result for the line intensity and the erasability, as calculated from the previous equation using gray values, were averaged for the thirteen panelists and are presented in Table 9.

TABLE 9

Image Analysis Results for Intensity and Erasability

| Writing Instrument | % Intensity Circles | % Intensity Sentences | % Erasability |
|---|---|---|---|
| Pencil (No. 2 HB lead) | 49.8 | 39.6 | 97.9 |
| Mechanical Pencil (0.7-mm 113 lead) | 52.2 | 41.2 | 97.8 |
| Writing instrument containing Sample G | 51.4 | 37.6 | 97.4 |

Although the present invention has been described in considerable detail with reference to certain preferred versions thereof, other versions are possible. Therefore, the spirit and scope of the appended claims should not be limited to the description of the preferred versions contained herein.

What is claimed is:

1. An erasable, shear-thinning writing composition comprising:
   a shear-thinning additive and
   graphite particles having a flake morphology in a liquid.

2. The composition of claim 1, wherein the composition has a shear-thinning index between about 0.01 and about 0.8.

3. The composition of claim 1, wherein the composition has a viscosity between 200 mPa·sec and 20,000 mPa·sec at a shear rate of about 1.0 sec$^{-1}$, and a viscosity between 10 mPa·sec and 1000 mPa·sec at a shear rate of about 100 sec$^{-1}$.

4. The composition of claim 1, wherein the composition has a viscosity between 2000 mPa·sec and 18,000 mPa·sec at a shear rate of about 1.0 sec$^{-1}$, and a viscosity between 50 mPa·sec and 700 mPa·sec at a shear rate of about 100 sec$^{-1}$.

5. The composition of claim 1, wherein said liquid comprises an aqueous solvent system.

6. The composition of claim 5, wherein the shear-thinning additive and graphite particles are dispersed within the aqueous solvent system.

7. The composition of claim 1, wherein the shear-thinning additive is a clay, an organoclay, a water-dispersible gum, an acrylic acid-based polymer, or a combination thereof.

8. The composition of claim 7, wherein the clay is a hectorite clay or a bentonite clay.

9. The composition of claim 1, wherein the shear-thinning additive is xanthan gum.

10. The composition of claim 7, wherein the water-dispersible gum is a polysaccharide.

11. The composition of claim 1, wherein the shear-thinning additive is an acrylic acid-based polymer.

12. The composition of claim 1, wherein the composition includes about 0.01 weight percent to about 10 weight percent of the shear-thinning additive.

13. The composition of claim 1, wherein the composition includes about 0.05 weight percent to about 5 weight percent of the shear-thinning additive.

14. The composition of claim 1, wherein the composition includes about 0.05 weight percent to about 2 weight percent of the shear-thinning additive.

15. The composition of claim 12, wherein the shear-thinning additive is a clay, an organoclay, a water-dispersible gum, an acrylic acid-based polymer, or a combination thereof.

16. The composition of claim 5, wherein the aqueous solvent system comprises at least one water-soluble organic solvent.

17. The composition of claim 5, wherein the aqueous solvent system further comprises at least one water-soluble organic solvent selected from the group consisting of glycols, polyhydric alcohols, glycol ethers, glycol ether esters, amines, amides, and alkanolamides.

18. The composition of claim 16, wherein the water-soluble organic solvent is propylene glycol.

19. The composition of claim 5, wherein the aqueous solvent system comprises water, propylene glycol, and glycerol.

20. The composition of claim 16, wherein the solvent system includes from about 0.5 parts to about 25 parts water per part water-soluble organic solvent(s).

21. The composition of claim 1, wherein the graphite particles comprise from about 1 weight percent to about 50 weight percent of the composition.

22. The composition of claim 1, wherein the graphite particles comprise from about 3 weight percent to about 25 weight percent of the composition.

23. The composition of claim 1, wherein the graphite particles comprise from about 5 weight percent to about 20 weight percent of the composition.

24. The composition of claim 1, wherein the graphite particles have an average thickness of less than about 1 micron, and an average particle diameter between about 1 micron and about 25 microns.

25. The composition of claim 1, wherein the graphite particles have an average thickness of less than about 0.5 micron, and an average particle diameter between about 2 microns and about 15 microns.

26. The composition of claim 1, wherein the graphite particles have an average thickness of less than about 0.25 micron, and an average particle diameter between about 3 microns and about 12 microns.

27. The composition of claim 1 further comprising at least one dispersant.

28. The composition of claim 27, wherein the dispersant is a water-soluble polymer.

29. The composition of claim 1, wherein the composition exhibits an erasability greater than about 80 percent and a line intensity greater than about 25 percent.

30. The composition of claim 1, wherein the composition exhibits an erasability greater than about 95 percent and a line intensity greater than about 30 percent.

31. The composition of claim 1, wherein the composition exhibits an erasability greater than about 97 percent and a line intensity greater than about 40 percent.

32. An erasable, shear-thinning writing composition, the composition comprising:

a shear-thinning additive; and, graphite particles having a flake morphology dispersed in a liquid, wherein the composition has a shear-thinning index between about 0.01 and about 0.8.

33. The composition of claim 32, wherein the composition has a viscosity between 200 mPa·sec and 20,000 mPa·sec at a shear rate of about 1.0 sec$^{-1}$, and a viscosity between about 10 mPa·sec and 1000 mPa·sec at a shear rate of about 100 sec$^{-1}$.

34. The composition of claim 32, wherein the composition has a viscosity between 2000 mPa·sec and 18,000 mPa·sec at a shear rate of about 1.0 sec$^{-1}$, and a viscosity between about 50 mPa·sec and 700 mPa·sec at a shear rate of about 100 sec$^{-1}$.

35. The composition of claim 32, wherein the shear-thinning additive is a clay, an organoclay, a water-dispersible gum, an acrylic acid-based polymer, or a combination thereof.

36. The composition of claim 32 further comprising pigment particles.

37. A writing instrument comprising:

a reservoir containing an erasable, shear-thinning writing composition comprising an aqueous solvent system, a shear-thinning additive, and graphite particles having a flake morphology, wherein the graphite particles and the shear-thinning additive are dispersed within the aqueous solvent system; and, a writing point in fluid communication with the reservoir.

38. The writing instrument of claim 37, wherein the writing instrument is a ballpoint pen.

39. A method of forming a marking, comprising:

making a marking on a substrate with an erasable, shear-thinning writing composition comprising a shear-thinning additive and graphite particles having a flake morphology.

40. The method of claim 39 further comprising erasing the marking from the substrate.

41. The method of claim 39, wherein the composition has shear-thinning index between about 0.01 and about 0.8.

42. The method of claim 39, wherein the composition a viscosity between 200 mPa·sec and 20,000 mPa·sec at a shear rate of about 1.0 sec$^{-1}$ and a viscosity between 10 mPa·sec and 1000 mPa·sec at a shear rate of about 100 sec$^{-1}$.

43. The method of claim 39, wherein the composition a viscosity between 2000 mPa·sec and 18,000 mPa·sec at a shear rate of about 1.0 sec$^{-1}$, and a viscosity between 50 mPa·sec and 700 mPa·sec at a shear rate of about 100 sec$^{-1}$.

44. The writing composition of claim 1, wherein the graphite particles have an aspect ratio of between about 1 and about 8.

45. The writing composition of claim 32, wherein the graphite particles have an aspect ratio of between about 1 and about 8.

46. The writing instrument of claim 37, wherein the graphite particles have aspect ratio of between about 1 and about 8.

47. The method of claim 39, wherein the graphite particles have an aspect ratio of between about 1 and about 8.

* * * * *